United States Patent [19]

Nagata et al.

[11] Patent Number: 4,920,267

[45] Date of Patent: Apr. 24, 1990

[54] METHOD OF DETECTING NOISE IN IMAGE SIGNALS

[75] Inventors: Takehumi Nagata; Tsutomu Kimura, both of Kanagawa, Japan

[73] Assignee: Fuji Photo Film Co., Ltd., Kanagawa, Japan

[21] Appl. No.: 179,821

[22] Filed: Apr. 11, 1988

[30] Foreign Application Priority Data

| | | | |
|---|---|---|---|
| Apr. 15, 1987 | [JP] | Japan | 62-92757 |
| Apr. 15, 1987 | [JP] | Japan | 62-92761 |
| Apr. 15, 1987 | [JP] | Japan | 62-92762 |
| Apr. 16, 1987 | [JP] | Japan | 62-93634 |

[51] Int. Cl.$^5$ .......................................... G01N 23/04
[52] U.S. Cl. ............................. 250/327.2; 250/484.1
[58] Field of Search .................. 250/327.2, 484.1; 382/54, 51, 52

[56] References Cited

U.S. PATENT DOCUMENTS

| | | | |
|---|---|---|---|
| 4,258,264 | 0/1981 | Kotera et al. | |
| 4,298,895 | 11/1981 | Arai et al. | 382/54 |
| 4,360,883 | 11/1982 | Ejiri et al. | 382/54 |
| 4,400,619 | 0/1983 | Kotera et al. | |

FOREIGN PATENT DOCUMENTS 56-11395 of 1981 Japan .
56-12599 of 1981 Japan .

OTHER PUBLICATIONS

Pratt W., "Digital Image Process," Wiley & Sons, pp. 319-321 (1978).
Young et al., "Handbook of Pattern Recog. and Image Process", Academic Press (1986) pp. 199-129.

*Primary Examiner*—Janice A. Howell
*Assistant Examiner*—Richard Hanig
*Attorney, Agent, or Firm*—Sughrue, Mion, Zinn, Macpeak & Seas

[57] ABSTRACT

In a method of detecting noise in image signals, noise contained in image signals representing a radiation image, which are obtained by exposing a stimulable phosphor sheet carrying the radiation image stored thereon to stimulating rays, and photoelectrically detecting light emitted by the exposed portion of the stimulable phosphor sheet in proportion to the stored radiation energy, is detected. The method comprises the steps of comparing the image signal a at each remark picture element A with values (b1+T1), (b2+T2), ..., (bn+Tn) obtained by adding predetermined values T1, T2, ..., Tn respectively to image signals b1, b2, ..., bn at picture elements B1, B2, ..., Bn in the vicinity of the remark picture element A, and recognizing that noise is contained in the image signal a in the case where the image signal a attains a value larger than every one of the values (b1+T1), (b2+T2), ..., (bn+Tn).

62 Claims, 9 Drawing Sheets

F I G. 15
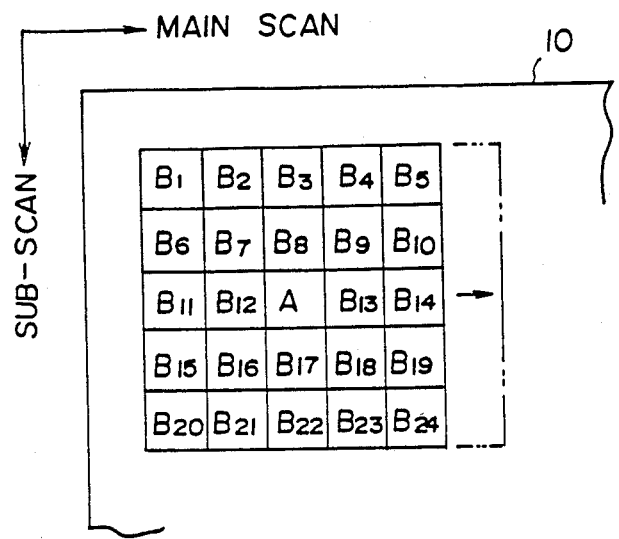
F I G. 20
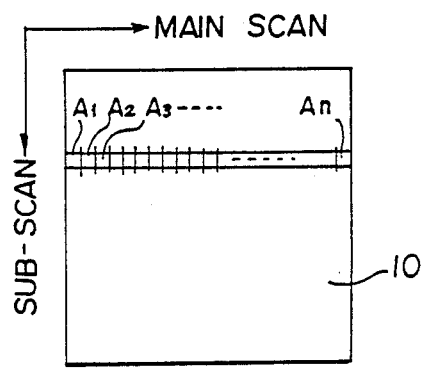

METHOD OF DETECTING NOISE IN IMAGE SIGNALS

BACKGROUND OF THE INVENTION

1. Field of the Invention

This invention relates to a method of detecting noise components contained in image signals obtained by reading out a radiation image stored on a stimulable phosphor sheet.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object such as the human body to have a radiation image of the object stored thereon, and is then exposed to stimulating rays which cause the stimulable phosphor sheet to emit light in proportion to the stored radiation energy. The light emitted by the stimulable phosphor sheet upon stimulation thereof is photoelectrically detected and converted to electric image signals by a photodetector (i.e. radiation image read-out processing is carried out), and the radiation image of the object is reproduced as a visible image by use of the image signals on a recording medium such as a photographic film, a display device such as a cathode ray tube (CRT), or the like.

As disclosed in, for example, U.S. Pat. No. 4,400,619 and Japanese Unexamined Patent Publication No. 56(1981)-12599, the stimulable phosphor sheet can be reused repeatedly for image recording by exposing the stimulable phosphor sheet to light or heat to release radiation energy remaining thereon after radiation image read-out has been carried out.

However, the stimulable phosphor sheet has a very high sensitivity, and therefore stores energy of radiations emitted by radioactive isotopes such as Ra226 and K40, which are contained in a trace amount in the stimulable phosphor of the stimulable phosphor sheet, or energy of environmental radiations such as cosmic rays and radiations emitted by radioactive isotopes contained in paints on indoor walls or the like. In the case where recording and reproduction of a radiation image are carried out by use of the stimulable phosphor sheet storing these types of radiation energy, small black points are caused by the radiation energy to appear in a reproduced visible image. Such black points adversely affect the image quality of the reproduced visible image.

If noise components generating the black points could be detected from the image signals obtained by the aforesaid radiation image read-out processing, it would become possible to prevent generation of the black points in the reproduced visible radiation image by processing the image signals for eliminating the noise components.

SUMMARY OF THE INVENTION

The primary object of the present invention is to provide a method of detecting noise in image signals, wherein noise components are detected accurately from image signals obtained by read-out processing of a stimulable phosphor sheet carrying a radiation image stored thereon.

The present invention provides a first method of detecting noise in image signals wherein noise contained in image signals, which are obtained by exposing a stimulable phosphor sheet carrying a radiation image stored thereon to stimulating rays, and photoelectrically detecting light emitted by the portion of the stimulable phosphor sheet exposed to the stimulating rays in proportion to the stored radiation energy by use of a photodetector, and which represent the radiation image, is detected, the method of detecting noise in image signals comprising the steps of:

(i) comparing the image signal a at each remark picture element A with values $(b1+T1)$, $(b2+T2)$, ..., $(bn+Tn)$ obtained by adding predetermined values $T1$, $T2$, ..., $Tn$ respectively to image signals $b1$, $b2$, ..., $bn$ at a plurality of picture elements $B1$, $B2$, ..., $Bn$ in the vicinity of said remark picture element A, and (ii) recognizing that noise is contained in said image signal a in the case where said image signal a attains a value larger than every one of said values $(b1+T1)$, $(b2+T2)$, ..., $(bn+Tn)$.

The present invention also provides a second method of detecting noise in image signals comprising the steps of:

(i) calculating a representative value $a0$ (for example, a mean value or a median value) of image signals $a1$ to $am$ at a plurality of remark picture elements $A1$ to $Am$ adjacent to one another, (ii) comparing said representative value $a0$ with values $(b1+T1)$, $(b2+T2)$, ..., $(bn+Tn)$ obtained by adding predetermined values $T1$, $T2$, ..., $Tn$ respectively to image signals $b1$, $b2$, ..., $bn$ at a plurality of picture elements $B1$, $B2$, ..., $Bn$ in the vicinity of said remark picture elements $A1$ to $Am$, and (iii) recognizing that noise is contained in said image signals $a1$ to $am$ in the case where said representative value $a0$ attains a value larger than every one of said values $(b1+T1)$, $(b2+T2)$, ..., $(bn+Tn)$.

In the first and second methods of detecting noise in image signals in accordance with the present invention, the predetermined values $T1$, $T2$, ..., $Tn$ may be identical or different, and may be zero.

The present invention further provides a third method of detecting noise in image signals comprising the steps of:

(i) calculating a mean-level value m with respect to the image signal a at each remark picture element A and image signals $b1$, $b2$, $b3$, ..., $bn$ at a plurality of picture elements $B1$, $B2$, $B3$, ..., $Bn$ in the vicinity of said remark picture element A, and (iii) recognizing that noise is contained in said image signal a in the case where $$a > m + k$$

where k denotes a constant.

In the third method of detecting noise in image signals in accordance with the present invention, as the mean-level value m, the mean value or the median value of the image signals a, b1, b2, b3, ..., bn may be used.

The present invention still further provides a fourth method of detecting noise in image signals comprising the steps of:

(i) extracting said image signals in the unit of the signals at n number of picture elements in each of blocks into which the region on said stimulable phosphor sheet is divided, (ii) calculating a mean-level value m with respect to the extracted image signals Fi, where i=1, 2, 3, ..., n, in each of the blocks, (iii) sequentially comparing the respective image signals Fi with a value of m+k, where k denotes a constant, in each of the blocks, and (iv) recognizing that noise is contained in said image signals Fi in the case where $$Fi > m+k.$$

In the fourth method of detecting noise in image signals in accordance with the present invention, as the mean-level value m, the mean value or the median value of the image signals Fi, where i=1, 2, 3, ..., n, may be used.

The present invention also provides a fifth method of detecting noise in image signals comprising the steps of:

(i) calculating the difference values $Di = Fi - Fi-1$, where i=2, 3, ..., n, between adjacent ones among the image signals F1, F2, F3, ..., Fn at picture elements A1, A2, A3, ..., An standing in a line in one direction, (ii) detecting the difference values Dj and Dk, where j<k, that satisfy the conditions of $$Dj > T1, Dk < -T2$$

where T1 and T2 denote positive constants, and (iii) recognizing that noise is contained in the image signals Fj to Fk−1 in the case where $$k < j + u$$

where u denotes a positive constant

The present invention further provides a sixth method of detecting noise in image signals comprising the steps of:

(i) calculating the difference values $Di = Fi - Fi-1$, where i=2, 3, ..., n, between adjacent ones among the image signals F1, F2, F3, ..., Fn at picture elements A1, A2, A3, ..., An standing in a line in one direction, (ii) detecting the difference values Dj and Dk, where j<k, that satisfy the conditions of Dj>T1, Dk< −T2 where T1 and T2 denote positive constants, (iii) calculating a two-dimensional position (s1,t1) of a middle picture element A0 among such picture elements Aj to Ak−1 that k<j+u, where u denotes a positive constant, on said stimulable phosphor sheet, (iv) calculating the difference values $Ei = Gi - Gi-1$, where i=2, 3, ..., m, between adjacent ones among the image signals G1, G2, G3, ..., Gm at picture elements B1, B2, B3, ..., Bm standing in a line approximately normal to the direction in which said picture elements A1, A2, A3, ..., An stand in a line, (v) detecting the difference values Ep and Eq, where p<q, that satisfy the conditions of $$Ep > T3, Eq < -T4$$

where T3 and T4 denote positive constants, (vi) calculating a two-dimensional position (s2,t2) of a middle picture element B0 among such picture elements Bp to Bq−1 that q<p+v, where v denotes a positive constant, on said stimulable phosphor sheet, and (vii) recognizing that noise is contained in the image signals Fj to Fk−1 or in the image signals Gp to Gq−1 in the case where $$|s1 - s2| < \alpha, \text{ or}$$

$$|t1 - t2| < \beta.$$

Experiments carried out by the inventors revealed that the level of the radiation energy stored as noise components on the stimulable phosphor sheet is extraordinarily higher than the level of the radiation energy around the positions of the noise components, i.e. the correct radiation energy level representing the radiation image. Also, it was found that the radiation energy as noise components is stored usually in the range of about nine picture elements, and is particularly concentrated in the range of about one or two picture elements, in the case of images generally subjected to diagnosis.

Therefore, in the case where processing is carried out in the same manner as mentioned above in the first method of detecting noise in image signals in accordance with the present invention, signal components of an extraordinarily high level, i.e. noise components caused by the radiation energy of radioactive isotopes or the like, can be detected.

Also, with the second method of detecting noise in image signals in accordance with the present invention wherein the representative value a0 of a plurality of remark picture elements is calculated and compared with the values (b1+T1) to (bn+Tn), the number of comparison processing can be decreased, and noise detection processing can be carried out quickly.

On the other hand, as is well known, the image signals at picture elements close to one another have high correlation. Therefore, in the third method of detecting noise in image signals in accordance with the present invention, when the constant k is adjusted to an appropriate value, the relationship of a <m+k holds in the case where no noise component is contained in the image signal a, and the relationship of a >m+k holds in the case where the image signal a contains noise components and attains an extraordinarily large value. Accordingly, the presence or absence of noise components can be detected based on such comparison.

In the fourth method of detecting noise in image signals in accordance with the present invention, the image signals Fi, where i=1, 2, 3, ..., n, at the picture elements in each block normally have high correlation to one another. Therefore, when the constant k is adjusted to an appropriate value, the relationship of Fi<m+k holds in the case where no noise component is contained in the image signals Fi, and the relationship of Fi>m+k holds in the case where the image signals Fi contains noise components and attains an extraordinarily large value. Accordingly, the presence or absence of noise components can be detected based on such comparison.

In the fifth method of detecting noise in image signals in accordance with the present invention, the difference values Di attain a very large positive value and a very small negative value (having a very large absolute value) at edges of the region where the radiation energy as noise components is stored. Therefore, the picture elements Aj and Ak at which $Dj > T1$, and $Dk < -T2$ as mentioned above are considered as the picture elements at the edges of the region where the radiation energy as noise components is stored (the picture elements Aj and Ak are at the edges opposite to each other in the array direction of the picture elements A1 to An, the picture element Aj is contained in the region where the radiation energy as noise components is stored, and the picture element Ak is adjacent to said region). Though such edges are present also at a high density region in a normal image, the high density region extends over a very wide area as compared with the aforesaid black points. Accordingly, in the case where the constant u is adjusted to be 1 or 2, or 6 at the most, the relationship of $k > j + u$ holds at the high density region in a normal image, and the relationship of $k < j + u$ holds at the edges of the black point region. Accordingly, the presence or absence of noise components can be detected based on such comparison.

With the sixth method of detecting noise in image signals in accordance with the present invention, when $k < j + u$, it is not immediately recognized that noise is contained in the image signals Fj to $Fk - 1$. Instead, the two-dimensional position (s1,t1) of the middle picture element A0 among the picture elements Aj to $Ak - 1$ is calculated. Also the two-dimensional position (s2,t2) of the middle picture element B0 among the picture elements Bp to $Bq - 1$ at which the radiation energy constituting noise is considered to be stored is calculated (the direction of picture element extraction is different). In the case where the two positions are close to each other, i.e. in the case where, as a result of noise detection by extracting the picture elements in two directions, it is recognized that noise is present at a portion of the stimulable phosphor sheet in both the noise detection by picture element extraction in one of the two directions and the noise detection by picture element extraction in the other of the two directions, it is recognized that noise is present in the image signals at said portion of the stimulable phosphor sheet. Therefore, there is no risk of erroneous detection.

Accordingly, with the first to sixth methods of detecting noise in image signals in accordance with the present invention, in the case where energy of radiations emitted by radioactive isotopes contained in the stimulable phosphor of the stimulable phosphor sheet or energy of environmental radiations is stored on the stimulable phosphor sheet, any noise component in the read-out image signals can be detected accurately and, therefore can be eliminated accurately. Accordingly, it is possible to prevent any black point from appearing in the reproduced visible radiation image. As a result, the image quality, particularly the diagnostic efficiency and accuracy, of the reproduced visible radiation image can be improved. Also, it becomes unnecessary to pay particular attention to the control of stimulable phosphor sheets in order to avoid storage of the radiation energy as a noise source. Therefore, the control of the stimulable phosphor sheets is facilitated. This is advantageous particularly in large-scale hospitals and other facilities where many stimulable phosphor sheets are to be processed.

BRIEF DESCRIPTION OF THE DRAWINGS

FIG. 15 is a schematic view showing different examples of a remark picture element and picture elements in the vicinity of the remark picture element in the third method of detecting noise in image signals in accordance with the present invention, FIG. 20 is an explanatory view showing extraction of picture elements in the fifth method of detecting noise in image signals in accordance with the present invention.

DESCRIPTION OF THE PREFERRED EMBODIMENTS

The present invention will hereinbelow be described in further detail with reference to the accompanying drawings.

Figure 1:
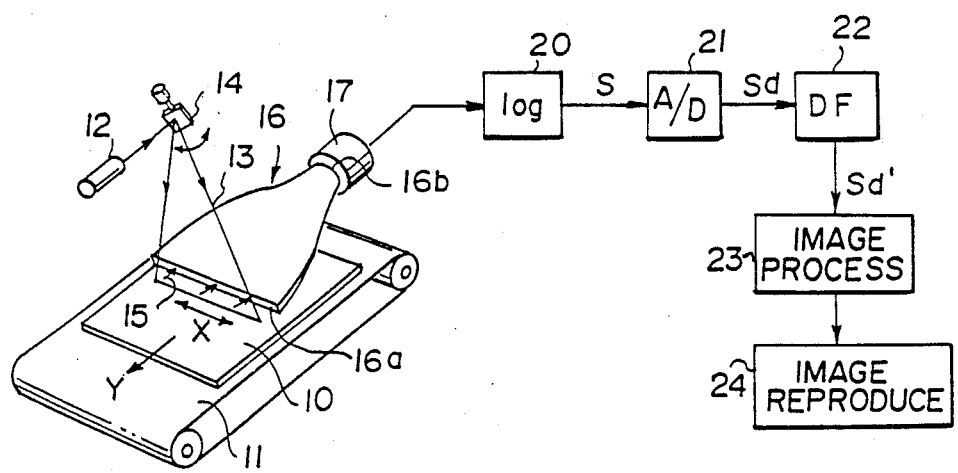
FIG. 1 is a schematic view showing an example of the radiation image read-out apparatus wherein a means for carrying out noise detection by the first method of detecting noise in image signals in accordance with the present invention is employed.

With reference to FIG. 1, a stimulable phosphor sheet 10 carrying a radiation image of an object stored thereon by being exposed to a radiation such as X-rays passing through the object is conveyed by a sheet conveyance means 11 comprising an endless belt or the like in a sub-scanning direction as indicated by the arrow Y. A laser beam 13 emitted as stimulating rays by a laser beam source 12 is deflected by a light deflector 14 constituted by a galvanometer mirror or the like, and scans the stimulable phosphor sheet 10 in a main scanning direction as indicated by the arrow X approximately normal to the sub-scanning direction as indicated by the arrow Y. When the stimulable phosphor sheet 10 is exposed to the laser beam 13, the exposed portion of the sheet 10 emits light 15 in an amount proportional to the stored radiation energy. The emitted light 15 is guided by a light guide member 16 and is photoelectrically detected by a photomultiplier 17 acting as a photodetector.

The light guide member 16 is made by forming a light guiding material such as an acrylic plate, and has a linear light input face 16a positioned to extend along the beam scanning line on the stimulable phosphor sheet 10, and a ring-shaped light output face 16b closely contacted with a light receiving face of the photomultiplier 17. The emitted light 15 entering the light guide member 16 from its light input face 16a is guided through total reflection inside of the light guide member 16, emanates from the light output face 16b, and is received by the photomultiplier 17. In this manner, the amount of the emitted light 15 carrying the radiation image information is detected by the photomultiplier 17.

Analog output signals generated by the photomultiplier 17 are logarithmically converted and amplified by a logarithmic amplifier 20 into read-out image signals S representing the amount of the emitted light 15, i.e. the radiation image, which are fed to an A/D converter 21. The read-out image signals S are digitized by the A/D converter 21 into digital read-out image signals Sd. The digital read-out image signal Sd thus obtained are then sent to a digital filter 22 which carries out filtering processing as will be described later and generates converted signals Sd'. The converted signals Sd' are fed to an image processing device 23 which carries out image processing such as gradation processing of the converted signals Sd', and are then sent to an image reproducing apparatus 24 such as a CRT or a light beam scanning recording apparatus. The radiation image which was stored on the stimulable phosphor sheet 10 is reproduced as a visible image by the image reproducing apparatus 24.

Figure 2:
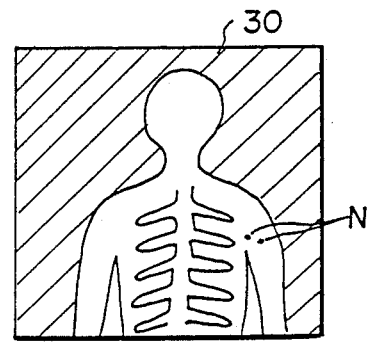
FIG. 2 is a schematic view showing an example of the reproduced visible radiation image wherein black points appear.

As mentioned above, the stimulable phosphor sheet 10 may store energy of radiations emitted by radioactive isotopes contained in the stimulable phosphor of the stimulable phosphor sheet 10 or energy of environmental radiations such as cosmic rays. In the case where the radiation image read-out is carried out on the stimulable phosphor sheet 10 carrying such radiation energy stored thereon, noise components caused by the radiation energy are contained in the read-out image signals S, and black points N appear as shown in FIG. 2 in a visible image 30 reproduced by the image reproducing apparatus 24. The digital filter 22 is provided for preventing generation of the black points N. The filtering processing carried out by the digital filter 22 will be described hereinbelow.

Figure 3:
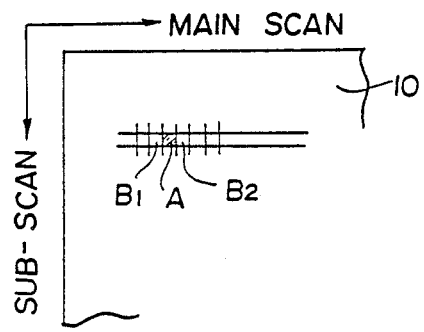
FIG. 3 and FIGS. 4A to 4D are explanatory views showing an embodiment of the first method of detecting noise in image signals in accordance with the present invention.

The digital filter 22 receives the digital image signals Sd representing a single image, and compares the image signal a at each remark picture element A among the digital image signals Sd with image signals b1 and b2 at picture elements B1 and B2 adjacent to the remark picture element A in the main scanning direction as shown in FIG. 3. The digital filter 22 carries out:

(1) conversion of the value of the image signal a to the value of the image signal b1 in the case where $a>b1$, $a>b2$ and, at the same time, $b1 \geq b2$, (2) conversion of the value of the image signal a to the value of the image signal b2 in the case where $a>b1$, $a>b2$ and, at the same time, $b2>b1$, and (3) maintaining of the value of the image signal a as it is in the other cases.

Figure 4A:
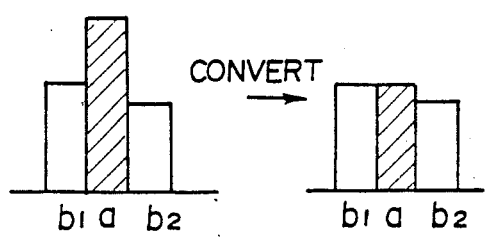
Figure 4B:
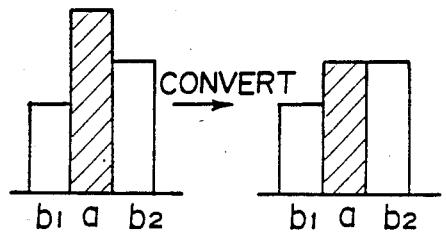
Figure 4C:
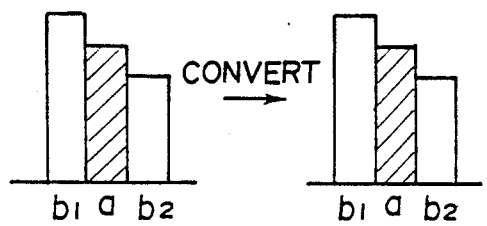
Figure 4D:
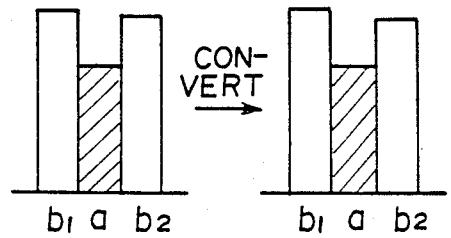

For simplicity of explanation, FIG. 4A shows the conversion of the value of the image signal a in the case (1), FIG. 4B shows the conversion thereof in the case (2), and FIGS. 4C and 4D show the conversion thereof in the case (3). The aforesaid processing is carried out for the image signals at all picture elements by shifting the remark picture element A by a single picture element at one time.

As mentioned above, the stored radiation energy caused by environmental radiations or the like attains an extraordinary value and an extraordinary distribution range. Therefore, as shown in FIGS. 4A and 4B, in the case where the level of the image signal a at a single picture element is markedly higher than the levels of the image signals b1 and b2 at the adjacent picture elements, the component of the markedly high level can be regarded as the noise component caused by the aforesaid radiation energy. Therefore, filtering processing is carried out for removing the excess part of the markedly high level, so that the black points N do not appear in the visible image reproduced by use of the signals Sd' obtained by the processing.

In this embodiment, the digital filter 22 is constituted for converting the value of the image signal a to the value of the image signal b1 or the value of the image signal b2, whichever is larger, in the case where noise is present. However, the digital filter 22 may also be constituted for converting the value of the image signal a to the value of the image signal b1 or the value of the image signal b2, whichever is smaller, or to the mean value of the values of the image signals b1 and b2. Also, instead of recognizing that noise is present in the case where $a>b1$ and, at the same time, $a>b2$, it may be recognized that noise is present in the case where $a>b1+T1$ and, at the same time, $a>b2+T2$ where T1 and T2 denote predetermined values. In this case, the values of T1 and T2 may be identical or different.

Figure 5:
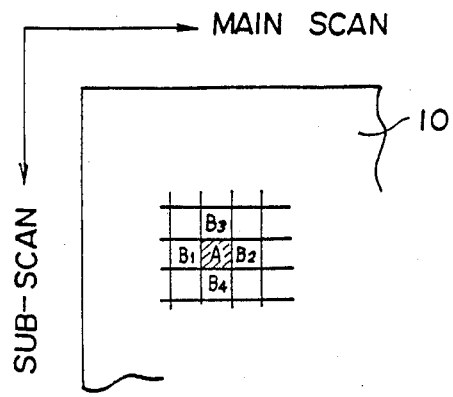
FIGS. 5, 6, 7 and 8 are explanatory views showing further embodiments of the first method of detecting noise in image signals in accordance with the present invention.

Also, in the aforesaid embodiment, comparison of the image signal values are carried out for the remark picture element A and the picture elements B1 and B2 adjacent to the remark picture element A, which stand in a line in one direction. However, noise detection may also be effected by carrying out comparison of the image signal values at picture elements standing in a line in two directions. Such an embodiment will be described hereinbelow. With reference to FIG. 5, a remark picture element A is considered, the picture elements adjacent to the remark picture element A in the main scanning direction are taken as B1 and B2, and the picture elements adjacent to the remark picture element A in the sub-scanning direction are taken as B3 and B4. Also, the image signal at the remark picture element A is denoted by a, and the image signals at the adjacent picture elements B1, B2, B3 and B4 are denoted respectively by b1, b2, b3 and b4. In this case, when all of the conditions of $a > b1, a > b2, a > b3,$ and $a > b4$ are satisfied, noise may be regarded as being present, and the value of the image signal a may be converted to a value close to the levels of the image signals b1 to b4 (i.e. to the maximum value, the minimum value, the mean value, or the median value of the image signals b1 to b4). This embodiment can basically be carried out by use of the apparatus similar to the apparatus shown in FIG. 1, and the configuration of the digital filter 22 may be modified (this also applies to the embodiments of the first method of detecting noise in image signals in accordance with the present invention, which will be described later).

Figure 6:
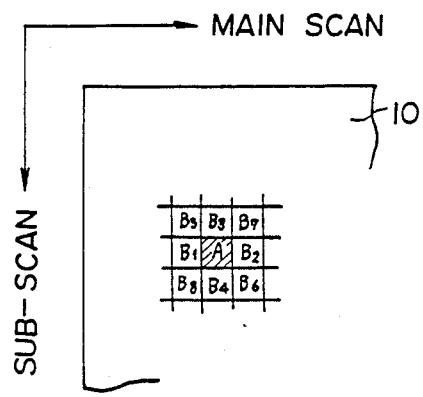

Also, as shown in FIG. 6, the image signals b1 to b4 at the adjacent picture elements B1 to B4 as well as image signals b5 to b8 at picture elements B5 to B8 adjacent to the remark picture element A in oblique directions may be considered. In this case, noise may be regarded as being present when all of the conditions of $a > b1, a > b2, a > b3, a > b4,$ $a > b5, a > b6, a > b7,$ and $a > b8$ are satisfied. As the number of the image signals that are compared with the image signal a increases, the accuracy of noise detection is improved though noise detection processing becomes complicated. In this case, the value of the image signal a may be converted to the maximum value, the minimum value, the mean value, or the median value of the image signals b1 to b8, or to a random value generated based on the mean value and the variance of the image signals b1 to b8.

Figure 7:
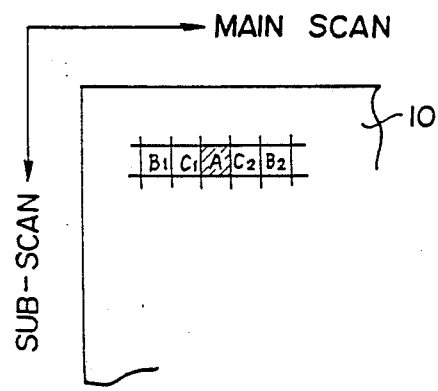

In the aforesaid embodiments, the presence or absence of noise is detected by comparing the image signal a at each remark picture element A with the image signals at the picture elements adjacent to the remark picture element A. On the other hand, depending on the picture element size or the like, it may occur that the energy of environmental radiations or the like is stored over a region broader than a single picture element. In such a case, noise detection may be carried out by utilizing the image signals at picture elements remoter from each remark picture element A than the picture elements adjacent to the remark picture element A. Such an embodiment will be described hereinbelow. With reference to FIG. 7, in this embodiment, the image signal a at the remark picture element A is compared with image signals b1 and b2 at picture elements B1 and B2 positioned more outward than picture elements C1 and C2 which are adjacent to the remark picture element A in the main scanning direction. In this case, noise is regarded as being present when $a > b1 + T1$ and, at the same time, $a > b2 + T2$ where T1 and T2 denote predetermined values. The predetermined values T1 and T2 may be identical or different. In the case where it is recognized that noise is present, the digital filter 22 converts the value of the image signal a to a value close to the levels of the image signals b1 and b2 (i.e. to a larger value or a smaller value between the image signals b1 and b2, or to the mean value thereof).

In this case, instead of converting the image signal a alone, the image signals c1 and c2 at the picture elements C1 and C2 adjacent to the remark picture element A should preferably be converted in the same manner as the conversion of the image signal a. With this technique, each image signal is converted three times at the most. The converted values thus obtained may be stored in a memory, and the maximum value, the minimum value, the mean value or the median value of the converted values may be taken as an ultimate converted value. Also, in this case, in the course of three times of noise detection processing, the image signal a at each remark picture element A may be regarded as containing noise in some cases, and may be regarded as containing no noise in the other cases. By way of example, to cope with this problem, the signal value at each remark picture element A may be ultimately taken as the original value a only in the case where the image signal a at the remark picture element A is regarded as containing no noise in all of the three times of noise detection processing, and may be converted in the same manner as mentioned above in the case where the image signal a is regarded as containing noise at least once in the course of the three times of noise detection processing.

Figure 8:
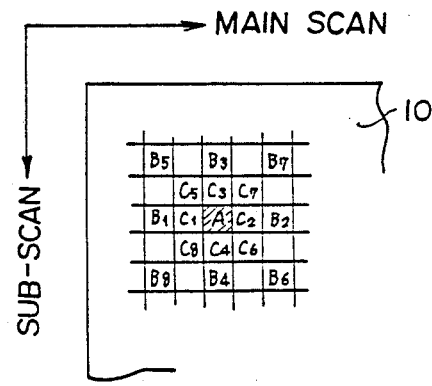

In the case where the image signals at the picture elements remoter from each remark picture element A than the picture elements adjacent to the remark picture element A are utilized for noise detection, noise detection may also be carried out based on the signal values at picture elements standing in a line in two directions. Such an embodiment will be described hereinbelow. With reference to FIG. 8, a remark picture element A is considered, the eight picture elements adjacent to the remark picture element A are denoted by C1, C2, C3, C4, C5, C6, C7 and C8, the picture elements adjacent to the picture elements C1 to C8 from the sides opposite to the remark picture element A are denoted by B1, B2, B3, B4, B5, B6, B7 and B8, and the image signals at the picture elements B1 to B8 are denoted by b1 to b8. In this case, the image signal a at the remark picture element A is regarded as containing noise when all of the conditions of $a > b1 + T1, a > b2 + T2, ..., a > b8 + T8$ where T1 to T8 denote predetermined values, are satisfied.

Conversion of the image signal a at the time the aforesaid conditions are satisfied may be carried out in the same manner as in the aforesaid embodiments. Also, in the case where noise is contained in the image signal a, the image signal a alone may be converted to a value close to the values of the image signals b1 to b8, or all of the image signals c1 to c8 at the picture elements C1 to C8 adjacent to the remark picture element A may be converted in the same manner as the conversion of the image signal a.

Figure 9:
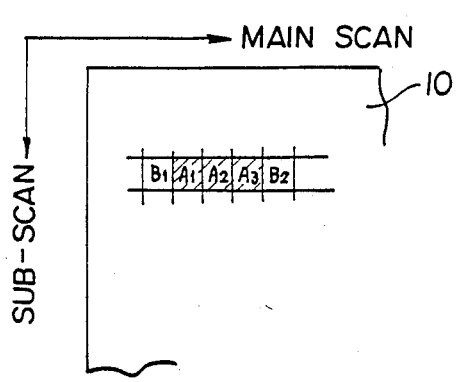
FIGS. 9, 10, 11 and 12 are explanatory views showing the embodiments of the second method of detecting noise in image signals in accordance with the present invention.

The second method of detecting noise in image signals in accordance with the present invention will be described hereinbelow. The second method can be carried out by modifying the configuration of the digital filter 22 in the apparatus shown in FIG. 1. A first embodiment of the second method will be described hereinbelow. The digital filter 22 first calculates a representative value a0 (for example, the median value or the mean value) of image signals a1, a2 and a3 at remark picture elements A1, A2 and A3 standing in a line adjacent to one another in the main scanning direction as shown in FIG. 9. The digital filter 22 then compares the representative value a0 with the values of image signals b1 and b2 at picture elements B1 and B2 which are adjacent to the remark picture elements A1, A2 and A3 in the main scanning direction. The digital filter 22 carries out:

(1) conversion of the values of the image signals a1, a2 and a3 to the value of the image signal b1 in the case where $a0>b1$, $a0>b2$ and, at the same time, $b1 \geq b2$, (2) conversion of the values of the image signals a1, a2 and a3 to the value of the image signal b2 in the case where $a0>b1$, $a0>b2$ and, at the same time, $b2>b1$, and (3) maintaining of the values of the image signals a1, a2 and a3 as they are in the other cases.

The aforesaid processing is repeated by shifting the remark picture elements A1, A2 and A3 by three picture elements at one time.

In this manner, generation of the black points N in the reproduced visible image is prevented. With this embodiment, the number of comparison processing becomes smaller, and noise detection and noise erasing processing can be carried quicker than in the case where the remark picture element is shifted by a single picture element at one time in the course of processing. In the case where noise is present, the values of the image signals a1, a2 and a3 may also be converted to the value of the image signal b1 or the value of the image signal b2, whichever is smaller, or to the mean value of the values of the image signals b1 and b2. Also, instead of recognizing that noise is present in the case where $a0>b1$ and, at the same time, $a0>b2$, it may be recognized that noise is present in the case where $a0>b1+T1$ and, at the same time, $a0>b2+T2$ where T1 and T2 denote predetermined values. In this case, the values of T1 and T2 may be identical or different.

Figure 10:
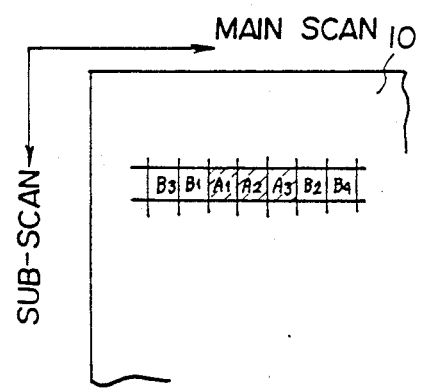

Also, as shown in FIG. 10, image signal values at picture elements B3 and B4 adjacent to the aforesaid adjacent picture elements B1 and B2 may also be taken into consideration. In this case, the image signals a1, a2 and a3 may be regarded as containing noise when all of the conditions of $a0>b1+T1$, $a0>b2+T2$, $a0>b3+T3$, $a0>b4+T4$ are satisfied.

Figure 11:
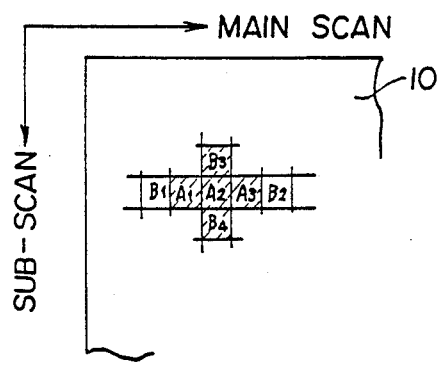

Also, in the aforesaid embodiment, comparison of the representative value with image signal values are carried out for the remark picture elements A1, A2 and A3, and the picture elements B1 and B2 adjacent to the remark picture elements A1, A2 and A3 (and also the picture elements B3 and B4 adjacent to the picture elements B1 and B2), which stand in a line in one direction. However, noise detection may also be effected by carrying out comparison of the image signal values at picture elements standing in a line in two directions. Such an embodiment will be described hereinbelow. With reference to FIG. 11, remark picture elements A1, A2 and A3 are considered, the picture elements adjacent to the remark picture element A in the main scanning direction are taken as B1 and B2, and the picture elements adjacent to the remark picture element A in the sub-scanning direction are taken as B3 and B4. Also, the median value of the image signals at the remark picture elements A1, A2 and A3 is denoted by a0, and the image signals at the adjacent picture elements B1, B2, B3 and B4 are denoted respectively by b1, b2, b3 and b4. In this case, when all of the conditions of $a0>b1$, $a0>b2$, $a0>b3$, and $a0>b4$ are satisfied, noise may be regarded as being present, and the values of the image signals a1, a2 and a3 may be converted to a value close to the levels of the image signals b1 to b4 (i.e. to the maximum value, the minimum value, the mean value, or the median value of the image signals b1 to b4).

Figure 12:
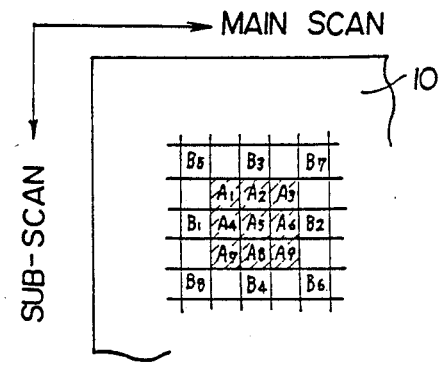

Alternatively, as shown in FIG. 12, picture elements A1 to A9 adjacent to one another in two directions may be taken as the remark picture elements, and a representative value a0 of image signals a1 to a9 at the remark picture elements A1 to A9 may be calculated and compared with image signals b1 to b8 at picture elements B1 to B8 which are adjacent to the remark picture elements A1 to A9 in the vertical, horizontal and diagonal directions. In this case, the image signals a1 to a9 may be regarded as containing noise when all of the conditions of $a0>b1+T1, ..., a0>b8+T8$ are satisfied.

Embodiments of the third method of detecting noise in image signals in accordance with the present invention will hereinbelow be described with reference to FIGS. 13, 14 and 15.

Figure 13:
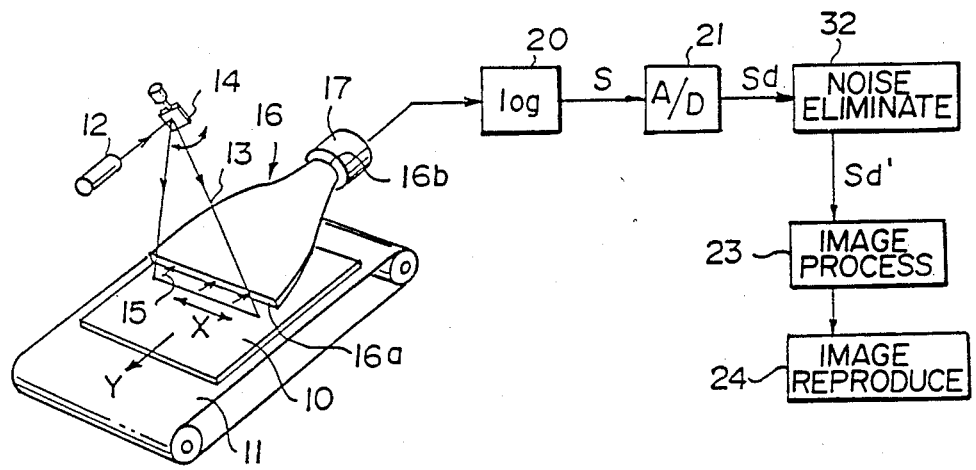
FIGS. 13 is a schematic view showing an example of the radiation image read-out apparatus wherein a means for carrying out noise detection by the third method of detecting noise in image signals in accordance with the present invention is employed.
Figure 14:
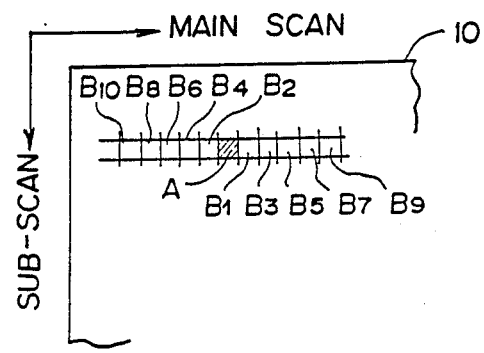
FIG. 14 is a schematic view showing examples of a remark picture element and picture elements in the vicinity of the remark picture element in the third method of detecting noise in image signals in accordance with the present invention.

FIG. 13 shows a radiation image read-out apparatus wherein noise detection is carried out by use of the third method of detecting noise in image signals in accordance with the present invention. In FIG. 13, similar elements are numbered with the same reference numerals with respect to FIG. 1. In this embodiment, the digital read-out image signals Sd obtained from the A/D converter 21 are processed by a noise eliminating circuit 32 in the manner as will be described below and, are converted into converted signals Sd'. The noise eliminating circuit 32 is provided for preventing generation of the aforesaid black points N. Processing by the noise eliminating circuit 32 will hereinbelow be described in detail.

The noise eliminating circuit 32 constituted by a micro-processor or the like receives the digital image signals Sd representing a single image. From the digital image signals Sd, the noise eliminating circuit 32 extracts the image signal a at each remark picture element A, and image signals b1, b2, b3, b4, b5, b6, b7, b8, b9 and b10 at picture elements B1, B2, B3, B4, B5, B6, B7, B8, B9 and B10 which are adjacent to one another in the main scanning direction with the remark picture element A intervening at the middle as shown in FIG. 14. Then, the noise eliminating circuit 32 calculates the mean value m and the variance $\sigma$ of the image signal a and the image signals b1 to b10, and compares the value of $(m+3\sigma)$ with the value of the image signal a. In the case where $a > m + 3\sigma$, the noise eliminating circuit 32 recognizes that noise components are contained in the image signal a, and converts the value of the image signal a to, for example, the minimum value, the maximum value, the mean value, or the medial value of the image signals b1 to b10.

As mentioned above, in the case where no noise component is contained in the image signal a, the relationship of $a < m + k$ ($k = 3\sigma$ in this embodiment) holds. On the other hand, in the case where noise components are contained in the image signal a, the value of the image signal a becomes extraordinarily higher than the values of the image signals b1 to b10 at the neighboring picture elements B1 to B10. Therefore, by comparing the value of the image signal a with the value of $(m + 3\sigma)$, it is possible to accurately detect whether noise components are contained or not in the image signal a.

In the case where the image signal a is regarded as containing noise components, the image signal a is converted in the same manner as mentioned above, so that the noise components caused by the energy of environmental radiations or the like are substantially eliminated. Therefore, in the case where the visible radiation image is reproduced by use of the image signals Sd' obtained by processing in the noise eliminating circuit 32, generation of the black points N in the reproduced visible image is prevented.

The value of the constant k adjusted to be $3\sigma$ in the aforesaid embodiment may be adjusted to any other appropriate value unrelated to the variance $\sigma$ in accordance with, for example, the sizes of the black points N, i.e. the sizes of regions at which the energy of environmental radiations is stored on the stimulable phosphor sheet 10, and the condition of distribution of the normal image signals at the picture elements close to one another. Also, instead of the mean value m of the image signals a and b1 to b10, the median value thereof or the like may be employed. As the value to which the image signal a is to be converted in the case where the image signal a is regarded as containing noise components, instead of the minimum value, the mean value or the like of the image signals b1 to b10, a random value generated based on the mean value m and the variance $\sigma$ or the like may be employed.

In the aforesaid embodiment, at the same time as detecting whether noise components are contained or not in the image signal a at the remark picture element A, it is also possible to detect whether noise components are contained or not in the image signals at the picture elements in the vicinity of the remark picture element A, i.e. to detect the sizes of the black points N. Specifically, in the case of the aforesaid embodiment, investigations are made to detect whether the formula of $$a > m + 3\sigma. \quad (1)$$

holds or not. Also, investigations are made to detect, for example, whether the formulas of $$b1 > m + 2\sigma. \quad (2)$$

$$b2 > m + 2\sigma. \quad (3)$$

$$b3 > m + \sigma. \quad (4)$$

$$b4 > m + \sigma. \quad (5)$$

hold or not. By way of example, in the case both Formulas (1) and (2) hold, or in the case where both Formulas (1) and (3) hold, the black point size is regarded as equivalent to two picture elements, and the image signal b1 or b2 is converted together with the image signal a in the same manner as mentioned above. The value to which the image signal b1 or the image signal b2 is converted may be identical to or different from the converted value of the image signal a (this also applies to the descriptions below). Also, in the case where Formulas (1), (2) and (3) hold, the black point size is regarded as equivalent to three picture elements, and the image signals b1 and b2 are converted together with the image signal a. In the same manner, the black point size may be regarded as equivalent to four picture elements in the case where Formulas (1), (2), (3), and (4) or (5) hold, and may be regarded as equivalent to five picture elements in the case where all of Formulas (1), (2), (3), (4) and (5) hold. Therefore, conversion of the image signals may be carried out in accordance with the detected size.

In the course of processing in the manner as mentioned above, as the remark picture element A is shifted by a single picture element at one time, the image signal at each picture element is converted five times at the most. The converted values thus obtained may be stored in a memory, and the maximum value, the minimum value, the mean value or the median value of the converted values may be taken as an ultimate converted value. Also, in this case, in the course of five times of noise detection processing, the image signal a at each remark picture element A may be regarded as containing noise in some cases, and may be regarded as containing no noise in the other cases. By way of example, to cope with this problem, the signal value at each remark picture element A may be ultimately taken as the original value a only in the case where the image signal a at the remark picture element A is regarded as containing no noise in all of the five times of noise detection processing, and may be converted in the same manner as mentioned above in the case where the image signal a is regarded as containing noise at least once in the course of the five times of noise detection processing.

In the aforesaid embodiment, the image signals at the remark picture element A and the neighboring picture elements B1 to B10 standing in a line in one direction together with the remark picture element A are extracted. However, it is possible to extract the image signals at the remark picture element A and a plurality of the picture elements spreading in two directions in the vicinity of the remark picture element A, and to detect noise based on the mean-level value of the image signals. Specifically, in this case, as shown in FIG. 15 by way of example, the remark picture element A and neighboring picture elements B1 to B24 surrounding the remark picture element A are considered. By way of example, the mean value m of image signals b1 to b24 at the neighboring picture elements B1 to B24 is calculated, and the image signal a at the remark picture element A is regarded as containing noise components in the case where the relationship of $$a > m + k$$

holds. In this case, in the same manner as mentioned above, the value of the image signal a may be converted to the minimum value, the maximum value, the mean value or the median value of the image signals b1 to b24, or to the minimum value, the maximum value, the mean value or the median value of the image signals at the picture elements B7, B8, B9, B12, B13, B16, B17 and B18 which are present adjacent the remark picture element A. The aforesaid processing is carried out for every picture element by shifting the remark picture element A by a single picture element at one time.

Also, in this case, at the same time as investigating whether noise components are contained or not in the remark picture element A, detection may be carried out to investigate whether noise components are contained or not in the image signals at the adjacent picture elements B7, B8, B9, B12, B13, B16, B17 and B18, and the image signals may be converted to an appropriate value when they are regarded as containing noise components.

Embodiments of the fourth method of detecting noise in image signals in accordance with the present invention will hereinbelow be described with reference to FIGS. 16, 17, 18 and 19. In the embodiments, the noise eliminating circuit 32 in FIG. 13 is modified to carry out processing as will be described below.

Figure 16:
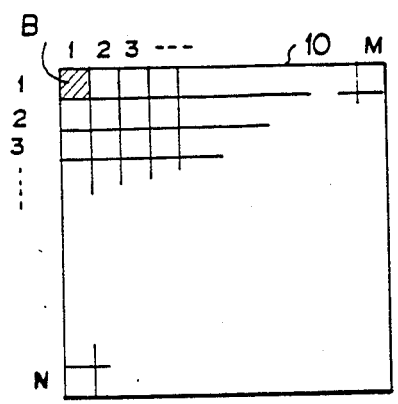
FIG. 16 is an explanatory view showing the division of the region on a stimulable phosphor sheet into blocks in the fourth method of detecting noise in image signals in accordance with the present invention.

The noise eliminating circuit 32 receives the digital image signals Sd representing a single image, and extracts the digital image signals Sd in the unit of the signals in each of blocks into which the region on the stimulable phosphor sheet 10 is divided. FIG. 16 shows the division into the blocks. In FIG. 16, the stimulable phosphor sheet 10 is divided into M×N number of blocks B, B, ... each of which is composed of n number of picture elements. In each of the blocks B, B, ..., the noise eliminating circuit 32 calculates the mean value m and the variance $\sigma$ of image signals $F_i$, where $i=1, 2, 3, ..., n$. Then, the noise eliminating circuit 32 compares each of the image signals F1, F2, F3, ..., Fn in each block B with the value of $m+k0\cdot\sigma$, where k0 is a constant. (The mean value m and the variance $\sigma$ are the values for each block B.) In the case where the formula of $$F_i > m + k0\cdot\sigma$$

holds for the image signal $F_i$, the noise eliminating circuit 32 converts the image signal $F_i$ to, for example, the mean value m. This processing is carried out for the image signals $F_i$, where $i=1, 2, 3, ..., n$, in every block B. As mentioned above, in the case where the condition of $F_i > m+k$ ($k=k0\cdot\sigma$ in this embodiment) holds, the image signal $F_i$ may be regarded as containing noise components caused by environmental radiations or the like. In this case, the noise components can be substantially removed by converting the image signal $F_i$ into the mean value m. Therefore, generation of the black points N in the reproduced visible image is prevented in the case where the visible radiation image is reproduced by use of the image signals Sd obtained by the aforesaid processing in the noise eliminating circuit 32.

The value of the constant k may be unrelated to the variance $\sigma$, and may be determined appropriately in accordance with the level of radiation energy caused by environmental radiations or the like and stored on the stimulable phosphor sheet 10, the condition of distribution of the values of the image signals $F_i$ in each block B, and other factors. Instead of the mean value m, for example, the median value of the n number of the image signals in each block B may be employed. Also, as the value to which the image signals $F_i$ are to be converted, instead of the mean value m, it is also possible to employ the aforesaid median value, the minimum value of the n number of the image signals in each block B, or a random value generated based on the mean value m and the variance $\sigma$.

Figure 17:
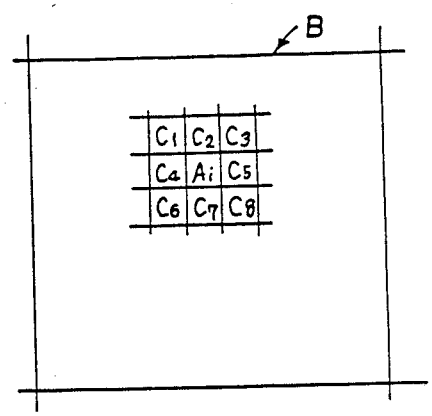
FIG. 17 is an explanatory view showing the relationship between a picture element recognized to contain noise components and picture elements adjacent thereto in the fourth method of detecting noise in image signals in accordance with the present invention.

In the case where the levels of the noise components caused by environmental radiations or the like are approximately constant, the noise components can be detected and eliminated by the method as mentioned above. However, in the case where the levels of the noise components are distributed such that they are high at some picture elements and gradually become lower toward the peripheral picture elements thereof, the noise components of comparatively low levels at the peripheral picture elements cannot be detected, depending on the value of the constant k. Another embodiment wherein such a problem is avoided will be described hereinbelow. In this embodiment, the noise eliminating circuit 32 carries out processing up to detection of such an image signal $F_i$ that $F_i > m+k0\cdot\sigma$ in each block B in the same manner as mentioned above. Then, as for each of the image signals at picture elements C1, C2, C3, C4, C5, C6, C7 and C8 adjacent to the picture element Ai at which $F_i > m+k0\cdot\sigma$ as shown in FIG. 17, the noise eliminating circuit 32 investigates whether the condition of $$F_i > m + k1\cdot\sigma$$

holds or not. The constant k1 is adjusted to a value smaller than the constant k0. In the case where $F_i > m+k1\cdot\sigma$, the noise eliminating circuit 32 converts the image signal $F_i$ to the mean value m or the like in the same manner as mentioned above. With this technique, it is possible to detect and eliminate the noise components of comparatively low levels which cannot be detected by merely investigating whether $F_i > m+k0\cdot\sigma$ or not. In the case where it is considered that the stored radiation energy caused by environmental radiations or the like extends more outward than the adjacent picture elements C1 to C8 and is distributed in the condition as mentioned above, detection may be carried out to investigate whether the condition of $F_i > m+k2\cdot\sigma$, where $k2 < k1$, holds or not also for the image signals $F_i$ at the picture elements adjacent to the picture elements C1 to C8.

Figure 18:
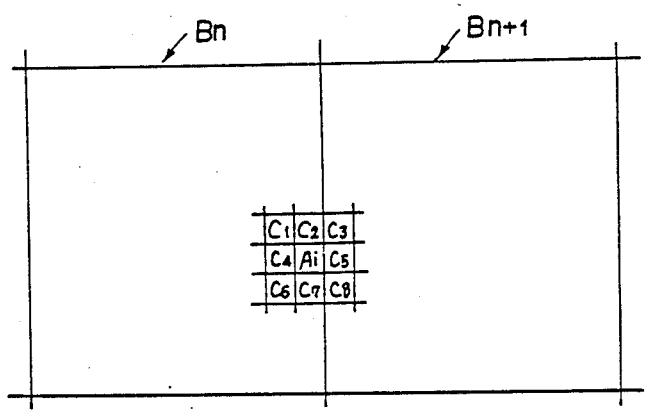
FIG. 18 is an explanatory view showing the division into blocks in detail.
Figure 19:
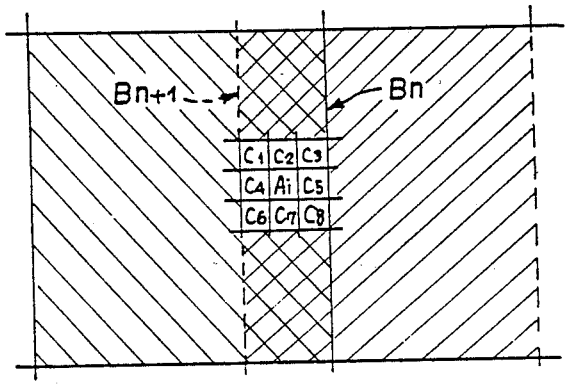
FIG. 19 is an explanatory view showing another example of the division into blocks in the fourth method of detecting noise in image signals in accordance with the present invention.

As shown in FIG. 18, in the case where the blocks B, B, ... are adjusted so that they do not overlap, it may occur that the picture element Ai, at which the highest level of radiation energy caused by environmental radiations or the like is stored, and the adjacent picture elements C3, C5 and C8, at which lower levels of radiation energy caused by environmental radiations or the like are stored, are divided into different blocks Bn and Bn+1. In this case, in the course of detecting the noise component of a high level and then sequentially detecting the noise components of lower levels, the image signals at the adjacent picture elements C3, C5 and C8 are not taken as the objectives in the block Bn+1 for investigating whether $F_i > m+k1\cdot\sigma$ or not. In order to avoid such a problem, as shown in FIG. 19, division into blocks should preferably be carried out so that the peripheral regions of the blocks adjacent to each other overlap slightly Though only the relationship in the horizontal direction between the positions of the blocks is shown in FIG. 19, division into blocks is carried out so that the peripheral block areas overlap also in the vertical direction.

In the case where the detection for investigating whether $Fi>m+k2\cdot\sigma$ or not is carried out from the original step for the image signals Fi at the picture elements in each block B, the noise components of comparatively low levels can be detected. However, in this case, there is the risk of the signal components, which represent the normal image and have a particularly high level, being regarded as the noise components. On the other hand, the aforesaid problem can be eliminated in the case where the noise component of the highest level is first detected and then investigations are carried for the peripheral picture elements of the picture element regarded to contain said noise component.

An embodiment of the fifth method of detecting noise in image signals in accordance with the present invention will hereinbelow be described with reference to FIGS. 20, 21A, 21B, 22A and 22B. In this embodiment, the noise eliminating circuit 32 in FIG. 13 is modified to carry out processing as will be described below.

Figure 21A:
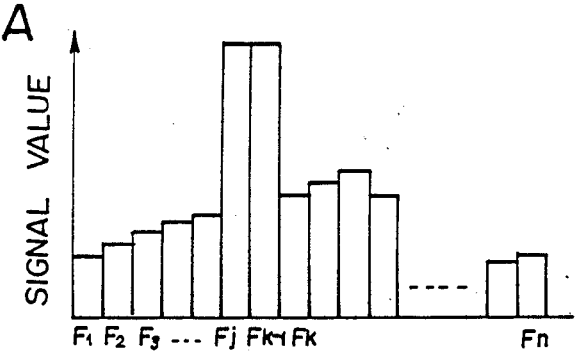
FIGS. 21A, 21B and FIGS. 22A and 22B are graphs showing an example of distribution of image signals and an example of distribution of difference value of the image signals in the fifth method of detecting noise in image signals in accordance with the present invention.
Figure 21B:
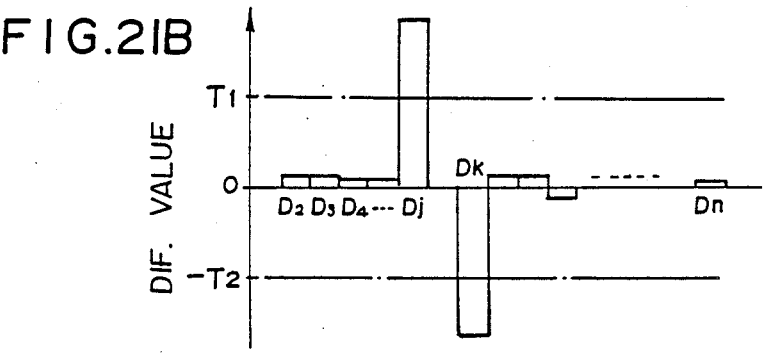

The noise eliminating circuit 32 receives the digital image signals Sd representing a single image. From the digital image signals Sd, the noise eliminating circuit 32 extracts the image signals F1, F2, F3, ..., Fn at the picture elements A1, A2, A3, ..., An standing in a line in the direction of main scanning of stimulating rays as shown in FIG. 20, and calculates difference values between adjacent ones among the image signals F1 to Fn by the formula expressed as $$Di=Fi-F(i-1)$$

where i=2, 3, ..., n. By way of example, FIG. 21A shows the levels of the image signals F1 to Fn, and FIG. 21B shows the difference values D2, D3, ..., Dn between adjacent ones among the image signals F1 to Fn. Then, the noise eliminating circuit 32 detects such difference values Dj and Dk, where j<k, that $Dj>T1$, $Dk<-T2$, where T1 and T2 are positive constants, from the difference values D2 to Dn. The values of T1 and T2 may be identical or different. In the case where the difference values Dj and Dk are detected, the noise eliminating circuit 32 investigates whether $k<j+6$ or not, i.e. whether the picture element Ak is spaced or not from the picture element Aj at least by a distance equal to six picture elements. In the case where $k<j+6$, i.e. in the case where the picture element Ak is spaced from the picture element Aj by a distance equal to five picture elements or less, the noise eliminating circuit 32 recognizes that the noise components are contained in the image signals Fj to F(k−1), and converts the image signals Fj to F(k−1) to, for example, the minimum value, the maximum value, the mean value or the median value of the image signals F1 to F(j−1) and Fk to Fn. The aforesaid processing is carried out over the overall region on the stimulable phosphor sheet 10 by shifting the line, from which the picture elements A1 to An are to be extracted, by a single picture element string at one time in the subscanning direction.

As mentioned above, by processing in this manner, it is possible to detect whether the noise components caused by environmental radiations or the like are contained or not in the image signals.

Figure 22A:
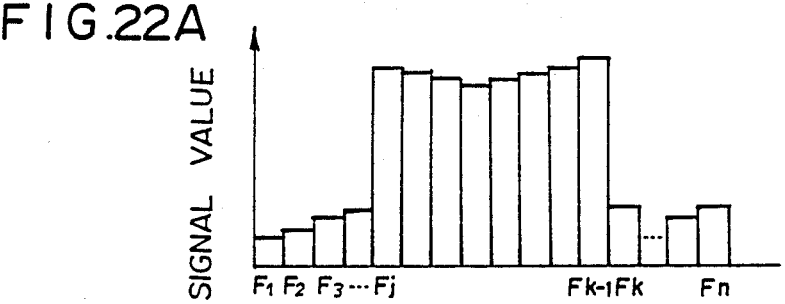
Figure 22B:
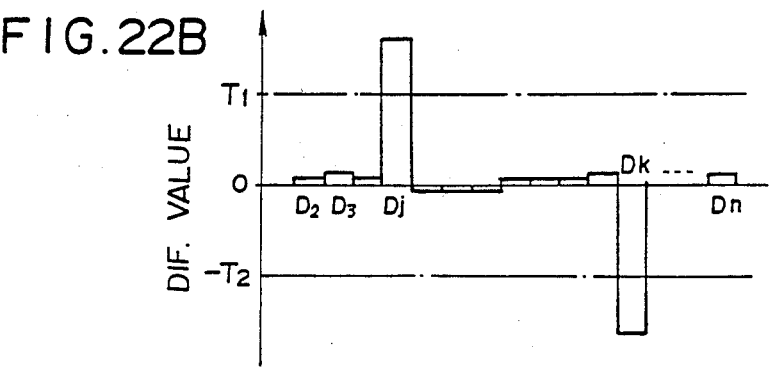

In the case of the digital image signals Sd detected from the stimulable phosphor sheet 10 on which an image containing a very high density is stored, the image signals A1 to An is distributed as shown in, for example, FIG. 22A and, as a result, such difference values Dj and Dk that $dj>T1$, $Dk<-T2$ are present as shown in FIG. 22B. However, in this case, the high-density image portion corresponding to the normal image extends over an area markedly broader than the areas of the black points N, the condition of $k>j+6$ holds.

In the case where it is recognized that noise components are contained in the image signals, the image signals are converted in the same manner as mentioned above, so that the noise components caused by the energy of environmental radiations or the like are substantially eliminated. Therefore, in the case where the visible radiation image is reproduced by use of the image signals Sd' obtained by processing in the noise eliminating circuit 32, generation of the black points N in the reproduced visible image is prevented.

The value of the constant u adjusted to be 6 in the aforesaid embodiment may be adjusted to any other appropriate value in accordance with, for example, the sizes of the black points N, i.e. the sizes of regions at which the energy of environmental radiations is stored on the stimulable phosphor sheet 10, and other factors. Also, as the value to which the image signals F are to be converted in the case where the image signals F are regarded as containing noise components, instead of the minimum value, the mean value or the like of the image signals F1 to F(j−1) and Fk to Fn, a value generated based on the mean value and the variance of these image signals or the like may be employed.

In the fifth method of detecting noise in image signals in accordance with the present invention, the difference values between adjacent ones among the image signals F1 to Fn are defined as $Di=Fi-F(i-1)$. However, it is also possible to define such difference values that $Di=F(i-1)-Fi$. Such definition of the difference values is identical with the definition in the fifth method in accordance with the present invention when the direction of numbering of the picture elements A1 to An is reversed. Therefore, such definition of the difference values is embraced in the scope of the fifth method in accordance with the present invention. This also applies to the sixth method of detecting noise in image signals in accordance with the present invention, which will be described below.

An embodiment of the sixth method of detecting noise in image signals in accordance with the present invention will be described hereinbelow. The sixth method may be carried out by modifying the configuration of the noise eliminating circuit 32 shown in FIG. 13. In this case, as in the fifth method mentioned above, the noise eliminating circuit 32 receives the digital image signals Sd, extracts the image signals F1 to Fn at the picture elements A1 to An standing in a line in the direction of main scanning of stimulating rays, and calculates the difference values expressed as $$Di=Fi-F(i-1)$$

where i=2, 3, ..., n. From the difference values D2 to Dn, the noise eliminating circuit 32 detects such difference values Dj and Dk, where j<k, that $Dj>T1$, $Dk<-T2$, where T1 and T2 are positive constants. In the case where $k<j+6$, the noise eliminating circuit 32 calculates the position of the middle picture element A0 among the picture elements Aj to A(k−1). The position thus calculated is the two-dimensional position on the stimulable phosphor sheet 10, and is defined as (s1,t1) on the orthogonal coordinate system which is set on the stimulable phosphor sheet 10. The position (s1,t1) is stored in an internal memory of the noise eliminating circuit 32. The aforesaid processing is carried out for all picture element strings in the main scanning direction on the stimulable phosphor sheet 10.

Figure 23:
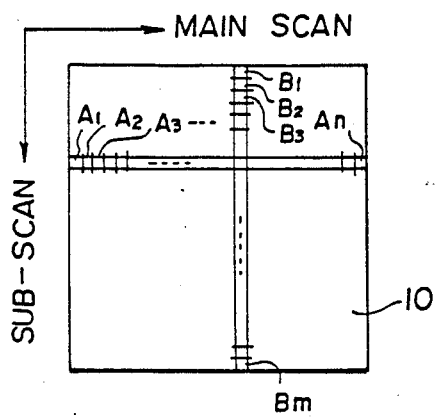
FIG. 23 is an explanatory view showing extraction of picture elements in the sixth method of detecting noise in image signals in accordance with the present invention.

Then, the noise eliminating circuit 32 extracts image signals G1 to Gm at picture elements B1 to Bm standing in a line, as shown in FIG. 23, approximately normal to the direction in which the picture elements A1 to An stand in a line, i.e. standing in a line in the direction of subscanning of stimulating rays. The noise eliminating circuit 32 calculates difference values expressed as $$Ei = Gi - G(i-1)$$

where i=2, 3, ..., n. From the difference values E2 to Em, the noise eliminating circuit 32 detects such difference values Ep and Eq, where p<q, that Ep>T3, Eq<−T4, where T3 and T4 are positive constants. In the case where q<p+6, the noise eliminating circuit 32 calculates the position of the middle picture element B0 among the picture elements Bp to Bq−1. The position thus calculated is the two-dimensional position on the stimulable phosphor sheet 10, and is defined as (s2,t2). The position (s2,t2) is stored in the internal memory of the noise eliminating circuit 32. The aforesaid processing is carried out for all picture element strings in the sub-scanning direction on the stimulable phosphor sheet 10.

Figure 24A:
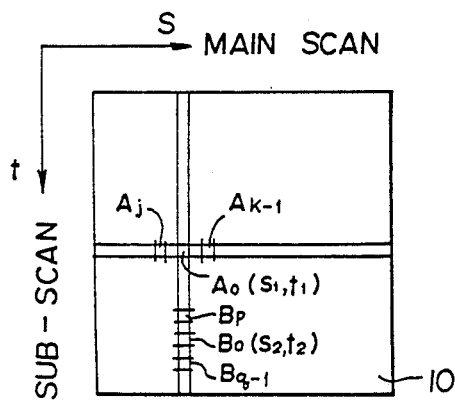
FIGS. 24A and 24B are explanatory views showing the sixth method of detecting noise in image signals in accordance with the present invention.
Figure 24B:
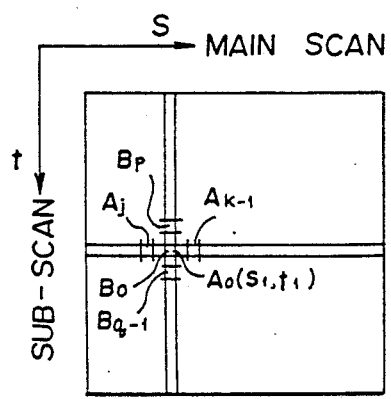

Thereafter, for each picture element string A1 to An in the main scanning direction, the noise eliminating circuit 32 investigates whether the position (s1,t1) of the middle picture element A0 is stored or not. In the case where the position (s1,t1) is detected as being stored, the noise eliminating circuit 32 investigates whether the position (s2,t2) is stored or not for the picture element string B1 to Bm on s=s1 as shown in FIG. 24A. In the case where the position (s2,t2) is detected as not being stored, the noise eliminating circuit 32 recognizes that no noise is contained in the image signals Fj to F(k−1). On the other hand, in the case where the position (s2,t2) is detected as being stored, the noise eliminating circuit 32 calculates whether $|t1-t2|<\beta$ or not, where $\beta$ denotes a positive constant. In the case where $|t1-t2| \geq \beta$ as shown in FIG. 24A, the noise eliminating circuit 32 recognizes that no noise is contained in the image signals Fj to F(k−1). On the other hand, in case where $|t1-t2|<\beta$ as shown in FIG. 24B, the noise eliminating circuit 32 recognizes that noise is contained in the image signals Fj to F(k−1). Specifically, as mentioned above, when k<j+6, it is considered that noise is contained in the image signals Fj to F(k−1). In the sixth method of the present invention, such noise detection is carried out also for the picture element string B1 to Bm extracted in the sub-scanning direction, and only the image signal that is regarded as containing noise in both cases of the noise detection in the main scanning direction and the noise detection in the sub-scanning direction is ultimately regarded as containing noise. In this manner, the accuracy of noise detection can be improved. Conversion of the image signal regarded as containing noise is carried out in the same manner as in the fifth method of the present invention.

A plurality of the positions (s2,t2) of the middle picture elements may often be stored for a single picture element string B1 to Bm. In this case, the noise eliminating circuit 32 investigates whether $|t1-t2|<\beta$ or not for all of the positions (s2,t2), and recognizes that noise is present when at least a single middle position (s2,t2) satisfying said condition is present.

The aforesaid processing is carried out for every picture element string A1 to An extending in the main scanning direction, and noise detection is carried out for all image signals over the overall region on the stimulable phosphor sheet 10.

In the aforesaid embodiment, the presence or absence of noise in the image signals Fj to F(k−1) is detected based on whether $|t1-t2|<\beta$ or not. Conversely, the presence or absence of noise in the image signals Gp to G(q−1) may be detected based on whether $|s1-s2|<\alpha$ or not, where $\alpha$ denotes a positive constant.

Also, in the aforesaid embodiment, with respect to the picture element string A1 to An, such a picture element string B1 to Bm that s1=s2 is selected from the original step. Instead, for example, with respect to the position (s1,t1) of the middle picture element in a single picture element string A1 to An, the positions (s2,t2) of the middle picture elements in a plurality of the picture element strings B1 to Bm in the vicinity of s=s1 may be read from the memory. In this case, the image signals Fj to F(k−1) may be regarded as containing noise when at least a single middle picture element position (s2,t2) satisfying the condition of $$|s1-s2|<\alpha,$$

$$|t1-t2|<1\beta$$

is present.

We claim:

1. A method of detecting noise in image signals which are obtained by exposing a stimulable phosphor sheet carrying a radiation image stored thereon to stimulating rays, and photoelectrically detecting light emitted by the portion of the stimulable phosphor sheet exposed to the stimulating rays in proportion to the stored radiation energy by use of a photodetector, and which represent the radiation image, is detected, the method of detecting noise in image signals comprising the steps of:

(i) comparing the image signal a at each remark picture element A with values (b1+T1), (b2+T2), ..., (bn+Tn) obtained by adding predetermined values T1, T2, Tn respectively to image signals b1, b2, ..., bn at a plurality of picture elements B1, B2, ..., Bn in the vicinity of said remark picture element A, and (ii) recognizing that noise is contained in said image signal a in the case where said image signal a attains a value larger than every one of said values (b1+T1), (b2+T2), ..., (bn+Tn).

2. A method as defined in claim 1 wherein the image signals at the picture elements B1 and B2 adjacent to each said remark picture element A are denoted by b1 and b2, and it is recognized that noise is contained in said image signal a in the case where a>b1 and, at the same time, a>b2.

3. A method as defined in claim 1 wherein the image signals at the picture elements B1 and B2 adjacent to each said remark picture element A in the horizontal direction are denoted by b1 and b2, the image signals at the picture elements B3 and B4 adjacent to said remark picture element A in the vertical direction are denoted by b3 and b4, and it is recognized that noise is contained in said image signal a in the case where all of the conditions of $a > b1, a > b2, a > b3,$ and $a > b4$ are satisfied.

4. A method as defined in claim 1 wherein the image signals at the picture elements B1 and B2 adjacent to each said remark picture element A in the horizontal direction are denoted by b1 and b2, the image signals at the picture elements B3 and B4 adjacent to said remark picture element A in the vertical direction are denoted by b3 and b4, the image signals at the picture elements B5 and B6 adjacent to said remark picture element A in one diagonal direction are denoted by b5 and b6, the image signals at the picture elements B7 and B8 adjacent to said remark picture element A in the other diagonal direction are denoted by b7 and b8, and it is recognized that noise is contained in said image signal a in the case where all of the conditions of $a > b1, a > b2, a > b3, a > b4,$ $a > b5, a > b6, a > b7,$ and $a > b8$ are satisfied.

5. A method as defined in claim 1 wherein two picture elements adjacent to each said remark picture element A are denoted by C1 and C2, the image signals at the picture elements B1 and B2 which are respectively adjacent to the picture elements C1 and C2 from the sides opposite to said remark picture element A are denoted by b1 and b2, and it is recognized that noise is contained in said image signal a in the case where $a > b1 + T1$ and, at the same time, $a > b2 + T2$.

6. A method as defined in claim 1 wherein two picture elements adjacent to each said remark picture element A in the horizontal direction are denoted by C1 and C2, the image signals at the picture elements B1 and B2 which are respectively adjacent to the picture elements C1 and C2 from the sides opposite to said remark picture element A are denoted by b1 and b2, two picture elements adjacent to said remark picture element A in the vertical direction are denoted by C3 and C4, the image signals at the picture elements B3 and B4 which are respectively adjacent to the picture elements C3 and C4 from the sides opposite to said remark picture element A are denoted by b3 and b4, and it is recognized that noise is contained in said image signal a in the case where all of the conditions of $a > b1 + T1, a > b2 + T2,$ $a > b3 + T3,$ and $a > b4 + T4$ are satisfied.

7. A method as defined in claim 1 wherein two picture elements adjacent to each said remark picture element A in the horizontal direction are denoted by C1 and C2, the image signals at the picture elements B1 and B2 which are respectively adjacent to the picture elements C1 and C2 from the sides opposite to said remark picture element A are denoted by b1 and b2, two picture elements adjacent to said remark picture element A in the vertical direction are denoted by C3 and C4, the image signals at the picture elements B3 and B4 which are respectively adjacent to the picture elements C3 and C4 from the sides opposite to said remark picture element A are denoted by b3 and b4, two picture elements adjacent to said remark picture element A in one diagonal direction are denoted by C5 and C6, two picture elements adjacent to said remark picture element A in the other diagonal direction are denoted by C7 and C8, the image signals at the picture elements B5 and B6 adjacent to the picture elements C5 and C6 from the sides opposite to said remark picture element A are denoted by b5 and b6, the image signals at the picture elements B7 and B8 adjacent to the picture elements C7 and C8 from the sides opposite to said remark picture element A are denoted by b7 and b8, and it is recognized that noise is contained in said image signal a in the case where all of the conditions of $a > b1 + T1, a > b2 + T2,$ $a > b3 + T3, a > b4 + T4,$ $a > b5 + T5, a > b6 + T6,$ $a > b7 + T7,$ and $a > b8 + T8$ are satisfied.

8. A method as defined in claim 1, further comprising the step of converting the value of the image signal a to a converted value when noise is recognized in said image signal a.

9. A method as defined in claim 8, wherein said converted value is dependent on said values $(b1 + T1)$, $(b2 + T2)$, ..., $(bn + Tn)$.

10. A method as defined in claim 9, wherein said converted value is the maximum of said values $(b1 + T1), (b2 + T2), ..., (bn + Tn)$.

11. A method as defined in claim 9, wherein said converted value is the minimum of said values $(b1 + T1), (b2 + T2), ..., (bn + Tn)$.

12. A method as defined in claim 9, wherein said converted value is the mean value of said values $(b1 + T1), (b2 + T2), ..., (bn + Tn)$.

13. A method as defined in claim 9, wherein said converted value is the median value of said values $(b1 + T1), (b2 + T2), ..., (bn + Tn)$.

14. A method as defined in claim 9, wherein said converted value is a random value generated based on the mean value and the variance of said values $(b1 + T1), (b2 + T2), ..., (bn + Tn)$.

15. A method of detecting noise in image signals which are obtained by exposing a simtulable phosphor sheet carrying a radiation image stored thereon to stimulating rays, and photoelectrically detecting light emitted by the portion of the stimulable phosphor sheet exposed to the stimulating rays in proportion to the stored radiation energy by use of a photodetector, and which represent the radiation image, is detected, the method of detecting noise in image signals comprising the steps of:

(i) calculating a representative value of a0 of image signals a1 to am at a plurality of remark picture elements A1 to Am which are adjacent to one another, (ii) comparing said representative value a0 with values (b1+T1), (b2+T2), ..., (bn+Tn) obtained by adding predetermined values T1, T2, ..., Tn respectively to image signals b1, b2, ..., bn at a plurality of picture elements A1 to Am, and (iii) recognizing that noise is contained in said image signals a1 to am in the case where said representative value a0 attains a value larger than every one of said values (b1+T1), (b2+T2), ..., (bn+Tn).

16. A method as defined in claim 15 wherein the image signals at the picture elements B1 and B2 adjacent to a plurality of said remark picture elements A1 to Am are denoted by b1 and b2, and it is recognized that noise is contained in said image signals a1 to am in the case where a0>b1 and, at the same time, a0>b2.

17. A method as defined in claim 15 wherein the image signals at the picture elements B1 and B2 adjacent to a plurality of said remark picture elements A1 to Am in the horizontal direction are denoted by b1 and b2, the image signals at the picture elements B3 and B4 adjacent to said remark picture elements A1 to Am in the vertical direction are denoted by b3 and b4, and it is recognized that noise is contained in said image signals a1 to am in the case where all of the conditions of a0>b1, a0>b2, a0>b3, and a0>b4 are satisfied.

18. A method as defined in claim 15 wherein the image signals at the picture elements B1 and B2 adjacent to a plurality of said remark picture elements A1 to Am in the horizontal direction are denoted by b1 and b2, the image signals at the picture elements B3 and B4 adjacent to said remark picture elements A1 to Am in the vertical direction are denoted by b3 and b4, the image signals at the picture elements B5 and B6 adjacent to said remark picture elements A1 to Am in one diagonal direction are denoted by b=and b6, the image signals at the picture elements B7 and B8 adjacent to said remark picture elements A1 to Am in the other diagonal direction are denoted by b7 and b8, and it is recognized that noise is contained in said image signals a1 to am in the case where all of the conditions of a0>b1, a0>b2, a0>b3, a0>b4, a0>b5, a0>b6, a0>b7, and a0>b8 are satisfied.

19. A method as defined in claim 15 wherein two picture elements adjacent to a plurality of said remark picture elements A1 to Am are denoted by C1 to C2, the image signals at the picture elements B1 and B2 which are respectively adjacent to the picture elements C1 and C2 from the sides opposite to said remark picture elements A1 to Am are denoted by b1 and b2, and it is recognized that noise is contained in said image signals a1 to am in the case where a0>b1+T1 and, at the same time, a0>b2+T2.

20. A method as defined in claim 15 wherein two picture elements adjacent to a plurality of said remark picture elements A1 to Am in the horizontal direction are denoted by C1 and C2, the image signals at the picture elements B1 and B2 which are respectively adjacent to the picture elements C1 and C2 from the sides opposite to said remark picture elements A1 to Am are denoted by b1 and b2, two picture elements adjacent to said remark picture elements A1 to Am in the vertical direction are denoted by C3 and C4, the image at the picture elements B3 and B4 which are respectively adjacent to the picture elements C3 and C4 from the sides opposite to said remark picture elements A1 to Am are denoted by b3 and b4, and it is recognized that noise is contained in said image signals a1 to am in the case where all of the conditions of a0>b1+T1, a0>b2+T2, a0>b3+T3, and a0>b4+T4 are satisfied.

21. A method as defined in claim 15 wherein two picture elements adjacent to a plurality of said remark picture elements A1 to Am in the horizontal direction are denoted by C1 and C2, the image signals at the picture elements B1 and B2 which are respectively adjacent to the picture elements C1 and C2 from the sides opposite to said remark picture elements A1 to Am are denoted by b1 and b2, two picture elements adjacent to said remark picture elements A1 to Am in the vertical direction are denoted by C3 and C4, the image signals at the picture elements B3 and B4 which are rspectively adjacent to the picture elements C3 and C4 from the sides opposite to said remark picture elements A1 to Am are denoted by b3 and b4, two picture elements adjacent to said remark picture elements A1 to Am in one diagonal direction are denoted by C5 and C6, two picture elements adjacent to said remark picture elements A1 to Am in the other diagonal direction are denoted by C7 and C8, the image signals at the picture elements B5 and B6 adjacent to the picture elements C5 and C6 from the sides opposite to said remark picture elements A1 to Am are denoted by b5 and b6, the image signals at the picture elements B7 and B8 adjacent to the picture elements C7 and C8 from the sides opposite to said remark picture elements A1 to Am are denoted by b7 and b8, and it is recognized that noise is contained in said image signals a1 to am in the case where all of the conditions of a0>b1+T1, a0>b2+T2, a0>b3+T3, a0>b4+T4, a0>b5+T5, a0>b6+T6, a0>b7+T7, and a0>b8+T8 are satisfied.

22. A method of detecting noise in image signals which are obtained by exposing a stimulable phosphor sheet carrying a radiation image stored thereon to stimulating rays, and photoelectrically detecting light emitted by the portion of the stimulable phosphor sheet exposed to the stimulating rays in proportion to the stored radiation energy by use of a photodetector, and which represent the radiation image, is detected, the method of detecting noise in image signals comprising the steps of:
(i) calculating a value m with respect to the image signal a at each remark picture element A and image signals b1, b2, b3, ..., bn at a plurality of picture elements B1, B2, B3, ..., Bn in the vicinity of said remark picture element A, and
(iii) recognizing that noise is contained in said image signal a in the case where $$a > m + k$$

where k denotes a constant and the value m is the median value of said image signal a and said image signals b1, b2, b3, ..., bn.

23. A method as defined in claim 22, wherein said constant k is of a value $\alpha$ times the variance $\sigma$ of said image signals b1, b2, b3, ..., bn, where $\alpha$ denotes a constant.

24. A method as defined in claim 15, wherein said representative value a0 is the mean value of image signals a1 through am.

25. A method as defined in claim 15, wherein said representative value a0 is the median value of image signals a1 through am.

26. A method as defined in claim 15, further comprising the step of converting the value of the image signal a to a converted value when noise is recognized in said image signal a.

27. A method as defined in claim 17, wherein said converted value is dependent on said values (b1+T1), (b2+T2), ..., (bn+Tn).

28. A method as defined in claim 27, wherein said converted value is the maximum of said values (b1+T1), (b2+T2), ..., (bn+Tn).

29. A method as defined in claim 27, wherein said converted value is the minimum of said values (b1+T1), (b2+T2), ..., (bn+Tn).

30. A method as defined in claim 27, wherein said converted value is the mean value of said values (b1+T1), (b2+T2), ..., (bn+Tn).

31. A method as defined in claim 27, wherein said converted value is the median value of said values (b1+T1), (b2+T2), ..., (bn+Tn).

32. A method as defined in claim 27, wherein said converted value is a random value generated based on the mean value and the variance of said values (b1+T1), (b2+T2), ..., (bn+Tn).

33. A method as defined in claim 22, further comprising the step of converting the value of the image signal a to a converted value when noise is recognized in said image signal a.

34. A method as defined in claim 33, wherein said converted value is dependent on said values b1, b2, ..., bn.

35. A method as defined in claim 34, wherein said converted value is the maximum of said values b1, b2, ..., bn.

36. A method as defined in claim 34, wherein said converted value is the minimum of said values b1, b2, ..., bn.

37. A method as defined in claim 34, wherein said converted value is the mean value of said values b1, b2, ..., bn.

38. A method as defined in claim 34, wherein said converted value is the median value of said values b1, b2, ..., bn.

39. A method as defined in claim 34, wherein said converted value is a random value generated based on the mean value and the variance of said values b1, b2, ..., bn.

40. A method as defined in claim 22, further comprising the step of detecting the size of a black point N causing the noise.

41. A method as defined in claim 40, further comprising the step of converting said image signal a to a converted value when noise is recognized in said image signal a and converting the values of said image signals b1, b2, b3, ..., bn depending on the size of said black point N.

42. A method as defined in claim 40, wherein the size of the black point N causing the noise is detected by comparing the image signals b1, b2, b3, ..., bn with m+k wherein k is of a value $\alpha$ times the variance of said image signals b1, b2, b3, ..., bn, where $\alpha$ is dependent on which of the image signals b1, b2, b3, ..., bn is being compared.

43. A method as defined in claim 42, further comprising the step of converting the value of the image signal a to a converted value when noise is recognized in said image signal and converting the values of said image signals b1, b2, b3, ..., bn depending on said comparison.

44. A method of detecting noise in image signals which are obtained by exposing a stimulable phosphor sheet carrying a radiation image stored thereon to stimulating rays, and photoelectrically detecting light emitted by the portion of the stimulable phosphor sheet exposed to the stimulating rays in proportion to the stored radiation energy by use of a photodetector, and which represent the radiation image, is detected, the method of detecting noise in image signals comprising the steps of:
(i) extracting said image signals into a plurality of blocks into which said stimulable phosphor sheet is divided, each block having n picture elements,
(ii) calculating a value m which depends on the extracted image signals Fi, where i=1, 2, 3, ..., n, in each of the blocks,
(iii) sequentially comparing the respective image signals Fi with a value of m+k, where k denotes a constant, in each of the blocks, and
(iv) recognizing that noise is contained in said image signals Fi in the case where $$Fi > m + k.$$

45. A method as defined in claim 44 wherein said value m is the mean value of said image signals Fi, where i=1, 2, 3, ..., n.

46. A method as defined in claim 44 wherein said value m is the median value of said image signals Fi, where i=1, 2, 3, ..., n.

47. A method as defined in any of claims 44, 45 and 46 wherein said constant k is of a value k0 times the variance $\sigma$ of said image signals Fi, where i=1, 2, 3, ..., n, and k0 denotes a constant.

48. A method as defined in claim 44, further comprising the step of converting the value of the image signal a to a converted value when noise is recognized in said image signal a.

49. A method as defined in claim 44, further comprising the step of recognizing that noise is contained in predetermined ones of said image signals Fi in the case where:

$$Fi > m + k2$$

where $k2 > k$.

50. A method as defined in claim 49, wherein the predetermined image signals are those image signals Fi having comparatively low noise level.

51. A method as defined in claim 49, further comprising the step of converting the value of the image signal Fi to a converted value when noise is recognized in said image signal Fi.

52. A method as defined in claim 44, wherein the peripheral regions of adjacent ones of said blocks overlap.

53. A method of detecting noise in image signals which are obtained by exposing a stimulable phosphor sheet carrying a radiation image stored thereon to stimulating rays, and photoelectrically detecting light emitted by the portion of the stimulable phosphor sheet exposed to the stimulating rays in proportion to the stored radiation energy by use of a photodetector, and which represent the radiation image, is detected, the method of detecting noise in image signals comprising the steps of:
(i) calculating the difference values $Di = Fi - [Fi-1]F(i-1)$, where $i = 2, 3, ..., n$, between adjacent ones among the image signals F1, F2, F3, ..., Fn at picture elements A1, A2, A3, ..., An standing in a line in one direction,
(ii) detecting the difference values Dj and Dk, where $j < k$, that satisfy the conditions of $$Dj > T1, Dk < -T2$$

where T1 and T2 denote positive constants, and
(iii) recognizing that noise is contained in the image signals Fj to [Fk-1]F(k-1) in the case where $$k < j + u$$

where u denotes a positive constant.

54. A method as defined in claim 53, further comprising the step of converting the value of the image signal Fi to a converted value when noise is recognized in said image signal Fi.

55. A method of detecting noise in image signals which are obtained by exposing a stimulable phosphor sheet carrying a radiation image stored thereon to stimulating rays, and a photoelectrically detecting light emitted by the portion of the stimulable phosphor sheet exposed to the stimulating rays in proportion to the stored radiation energy by use of a photodetector, and which represent the radiation image, is detected, the method of detecting noise in image signals comprising the steps of:
(i) calculating the difference values $Di = Fi - [Fi-1]F(i-1)$, where $i = 2, 3, ..., n$, between adjacent ones among the image signals F1, F2, F3, Fn at picture elements A1, A2, A3, ..., An standing in a line in one direction,
(ii) detecting the difference values Dj and Dk, where $j > k$, what satisfy the conditions of $$Dj > T1, Dk < -T2$$

where T1 and T2 denote positive constants.

(iii) calculating a two-dimensional position (s1t1) of a middle picture element A0 among such picture elements Aj to $[Ak-1]A(k-1)$ that $k < j + u$, where u denotes a positive constant, on said stimulable phosphor sheet,
(iv) calculating the difference values $Ei = Gi - [Gi-1]G(i-1)$, where $i = 2, 3, ..., m$, between adjacent ones among the image signals G1, G2, G3, ..., Gm at picture elements B1, B2, B3, ..., Bm standing in a line approximately normal to the direction in which said picture elements A1, A2, A3, ..., An stand in a line,
(v) detecting the difference values Ep and Eq, where $p < q$, that satisfy the conditions of $$Ep > T3, Eq < -T4$$

where T3 and T4 denote positive constant,
(vi) calculating a two-dimensional position (s2, t2) of a middle picture element B0 among such picture elements Bp to $[Bq-1]B(q-1)$ that $1 < p + v$, where v denotes a positive constant, on said stimulable phosphor sheet, and
(vii) recognizing that noise is contained in the image signals Fj to $[Fk-1]F(k-1)$ or in the image signals Gp to $[G1-1]G(q-1)$ in the case where $$|s1 - s2| < \alpha, \text{ or}$$

$$|t1 - t2| < \beta$$

where $\alpha$ and $\beta$ denote positive constants.

56. A method as defined in claim 55, further comprising the step of converting the value of the image signal Fi to a converted value when noise is recognized in said image signal Fi.

57. A method of detecting noise in image signals comprising the steps of:
(i) comparing the image signal a at each remark picture element A with values $(b1 + T1)$, $(b2 + T2)$, ..., $(bn + Tn)$ obtained by adding predetermined values T1, T2, ..., Tn respectively to image signals b1, b2, ..., bn at a plurality of picture elements B1, B2, ..., Bn in the vicinity of said remark picture element A, and
(ii) recognizing that noise is contained in said image signal a in the case where said image signal a attains a value larger than every one of said values $(b1 + T1)$, $(b2 + T2)$, ..., $(bn + Tn)$.

58. A method of detecting noise in image signals comprising the steps of:
(i) calculating a representative value a0 of image signals a1 to am at a plurality of remark picture elements A1 to Am which are adjacent to one another,
(ii) comparing said representative value a0 with values $(b1 + T1)$, $(b2 + T2)$, ..., $(bn + Tn)$ obtained by adding predetermined values T1, T2, ..., Tn respectively to image signals b1, b2, ..., bn at a plurality of picture elements B1, B2, ..., Bn in the vicinity of said remark picture elements A1 to Am, and
(iii) recognizing that noise is contained in said image signals a1 to am in the case where said representative value a0 attains a value larger than every one of said values $(b1 + T1)$, $(b2 + T2)$, ..., $(bn + Tn)$.

59. A method of detecting noise in image signals comprising the steps of:

(i) calculating a value m with respect to the image signal a at each remark picture element A and image signals b1, b2, b3, ..., bn at a plurality of picture elements B1, B2, B3, ..., Bn in the vicinity of said remark picture element A, and (iii) recognizing that noise is contained in said image signal a in the case where $$a > m + k$$

where k denotes a constant and the value m is the median value of said image signal a and said image signals b1, b2, b3, ..., bn.

60. A method of detecting noise in image signals comprising the steps of:
   (i) extracting said image signals into a plurality of blocks each having n picture elements,
   (ii) calculating a value m which depends on the extracted image signals Fi, where i=1, 2, 3, ..., n, in each of the blocks,
   (iii) sequentially comparing the respective image signals Fi with a value of m+k, where k denotes a constant, in each of the blocks, and
   (iv) recognizing that noise is contained in said image signals Fi in the case where $$Fi > m + k.$$

61. A method of detecting noise in image signals comprising the steps of:
   (i) calculating the difference values $Di = Fi - F(i-1)$, where i=2, 3, ..., n, between adjacent ones among the image signals F1, F2, F3, Fn at picture elements A1, A2, A3, ..., An standing in a line in one direction,
   (ii) detecting the difference values Dj and Dk, where j<k, that satisfy the conditions of $$Dj > T1, \ Dk < -T2$$

where T1 and T2 denote positive constants, and
   (iii) recognizing that noise is contained in the image signals Fj to F(k−1) in the case where $$k < j + u$$

where u denotes a positive constant.

62. A method of detecting noise in image signals comprising the steps of:
   (i) calculating the difference values $Di = Fi - F(i-1)$, where i=2, 3, ..., n, between adjacent ones among the image signals F1, F2, F3, ..., Fn at picture elements A1, A2, A3, ..., An standing in a line in one direction,
   (ii) detecting the difference values Dj and Dk, where j<k, what satisfy the conditions of $$Dj > T1, \ Dk < -T2$$

where T1 and T2 denote positive constants,
   (iii) calculating a two-dimensional position (s1, t1) of a middle picture element A0 among such picture elements Aj to A(k−1) that k<j+u, where u denotes a positive constant,
   (iv) calculating the difference values $Ei = Gi - G(i-1)$, where i=2, 3, ..., m, between adjacent ones among the image signals G1, G2, G3, ..., Gm at picture elements B1, B2, B3, ..., Bm standing in a line approximately normal to the direction in which said picture elements A1, A2, A3, ..., An stand in a line,
   (v) detecting the difference values Ep and Eq, where p<q, that satisfy the conditions of $$Ep > T3, \ Eq < -T4$$

where T3 and T4 denote positive constant,
   (vi) calculating a two-dimensional position (s2, t2) of a middle picture element B0 among such picture elements Bp to B(q−1) that q<p+v, where v denotes a positive constant, on said stimulable phosphor sheet, and
   (vii) recognizing that noise is contained in the image signals Fj to F(k−1) or in the image signals Gp to G(q−1) in the case where $$|s1 - s2| < \alpha, \text{ or}$$

$$|t1 - t2| < \beta$$

where $\alpha$ and $\beta$ denote positive constants.

* * * * *